United States Patent
Watkins

(10) Patent No.: US 7,111,319 B1
(45) Date of Patent: Sep. 19, 2006

(54) SET TOP BOX ACCESS HUB SYSTEM

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 1054 days.

(21) Appl. No.: 09/949,974

(22) Filed: Sep. 10, 2001

(51) Int. Cl.
*H04N 7/16* (2006.01)

(52) U.S. Cl. .................. 725/139; 725/131; 725/151; 725/141; 704/270; 704/275; 386/83

(58) Field of Classification Search .............. 725/88, 725/100, 133, 141, 21, 139
See application file for complete search history.

(56) References Cited

U.S. PATENT DOCUMENTS

| | | | | |
|---|---|---|---|---|
| 5,706,388 A | * | 1/1998 | Isaka | 386/125 |
| 5,774,859 A | * | 6/1998 | Houser et al. | 704/275 |
| 5,860,065 A | * | 1/1999 | Hsu | 704/270 |
| 6,058,239 A | * | 5/2000 | Doyle | 386/46 |
| 6,166,780 A | * | 12/2000 | Bray | 348/632 |
| 6,233,695 B1 | | 5/2001 | Ahn | |
| 6,269,394 B1 | | 7/2001 | Kenner et al. | |
| 6,480,819 B1 | * | 11/2002 | Boman et al. | 704/9 |
| 6,741,791 B1 | * | 5/2004 | Wymore et al. | 386/46 |
| 6,868,225 B1 | * | 3/2005 | Brown et al. | 386/83 |
| 6,985,669 B1 | * | 1/2006 | Unger | 386/46 |
| 2001/0013123 A1 | * | 8/2001 | Freeman et al. | 725/34 |
| 2002/0032907 A1 | * | 3/2002 | Daniels | 725/51 |
| 2002/0071424 A1 | * | 6/2002 | Chiu et al. | 370/352 |
| 2002/0087981 A1 | * | 7/2002 | Daniels | 725/38 |
| 2004/0216160 A1 | * | 10/2004 | Lemmons et al. | 725/46 |

* cited by examiner

*Primary Examiner*—Vivek Srivastava
*Assistant Examiner*—Farzana E. Hossain
(74) *Attorney, Agent, or Firm*—Christopher P. Maiorana, P.C.

(57) ABSTRACT

An apparatus comprising an audio/video decoder and a storage device. The audio/video decoder may be configured to receive (i) one or more uncompressed audio signals and (ii) one or more compressed audio/video signals. The uncompressed audio signals may be tagged to the compressed audio/video signals and (ii) any of the one or more uncompressed audio signals and the one or more tagged compressed audio/video signals may be stored in the storage device and available for a playback relative to the tags.

18 Claims, 10 Drawing Sheets

TV USER SELECTS
- ANY OF 6 LIVE FEEDS (STBFEED)
- ANY OF 6 HDD 114 RECORDED FEED (PES)
- ANY COMBINATION OF 6 LIVE AND 6 RECORDED ON MATRIX DISPLAY

REMOTE STB/PLAYER - MOBILE

REMOTE STB PLAYER - TO OTHER TV

SET TOP BOX ACCESS HUB SYSTEM

FIELD OF THE INVENTION

The present invention relates to a method and/or architecture for implementing a set top box (STB) system generally and, more particularly, to a STB access hub system.

BACKGROUND OF THE INVENTION

Some conventional set top box (STB) systems include digital video recorders (DVR) and/or dual tuners. For example, the Microsoft Ultimate TV Digital Video Recorder has dual tuners and Picture-in-Picture (PIP) functions (e.g., pause, replay, etc. in one window while live action is viewed in another window). Programming for the PIP sources can be from over the air broadcasts, cable, satellite, the Internet, etc.

Such conventional approaches are constrained to playback, pause/record or record. In particular, conventional approaches do not have capabilities such as integration with other home appliances (e.g., intercom, doorbell, etc.).

It would be desirable to implement a system that provided convenient user functions that may be implemented on a variety of input sources.

SUMMARY OF THE INVENTION

The present invention concerns an apparatus comprising an audio/video decoder and a storage device. The audio/video decoder may be configured to receive (i) one or more uncompressed audio signals and (ii) one or more compressed audio/video signals. The uncompressed audio signals may be tagged to the compressed audio/video signals and (ii) any of the one or more uncompressed audio signals and the one or more tagged compressed audio/video signals may be stored in the storage device and available for a playback relative to the tags.

The objects, features and advantages of the present invention include providing a method and/or architecture for implementing a set-top-box (STB) access hub system that may (i) allow a viewer to capture adaptive differential pulse code modulation (ADPCM) audio while viewing, (ii) provide an intercom function such that a microphone input is used to send through audio, muting normal audio, to viewer(s), (iii) provide web access, (iv) use previously cached web pages that are on the HDD to avoid accessing the web via the modem TCP/IP, (v) turn off when there has been no web access for 'x' minutes, (vi) store feeds with a timing relationship between them based on relative and/or wall clock time, (vii) pause, view, mute, intercom, consumer audio capture relationship (e.g., line 21 text may be analyzed for keyword matches any of a number of feeds (e.g., 12 feeds)), (viii) automatically search through all channels in an average divided way to search for keyword matches, (ix) enable web access in a separate window based on keyword searches, (x) set markers with ADPCM audio capture and remote control unit (RCU) buttons, (xi) use RCU to mark program elementary stream (PES) sections for indexing, selection, save or deletion, blending, referencing, etc. (xii) provide HDD clean up where all video not used in the last 'x' days is deleted as record priority is taken, (xiii) provide a remote STB that has flash memory to save program selection, display selection, point in program(s) where a stop occurred, point of keyword search stop, etc. and/or (xiv) implement a game score (e.g., in upper left of viewing screen) supported across all decoded video where the user may click on for full screen display, or optionally on a delta threshold when armed (e.g., the system may automatically display the full video or mark recording for playback of the last 'n' seconds).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
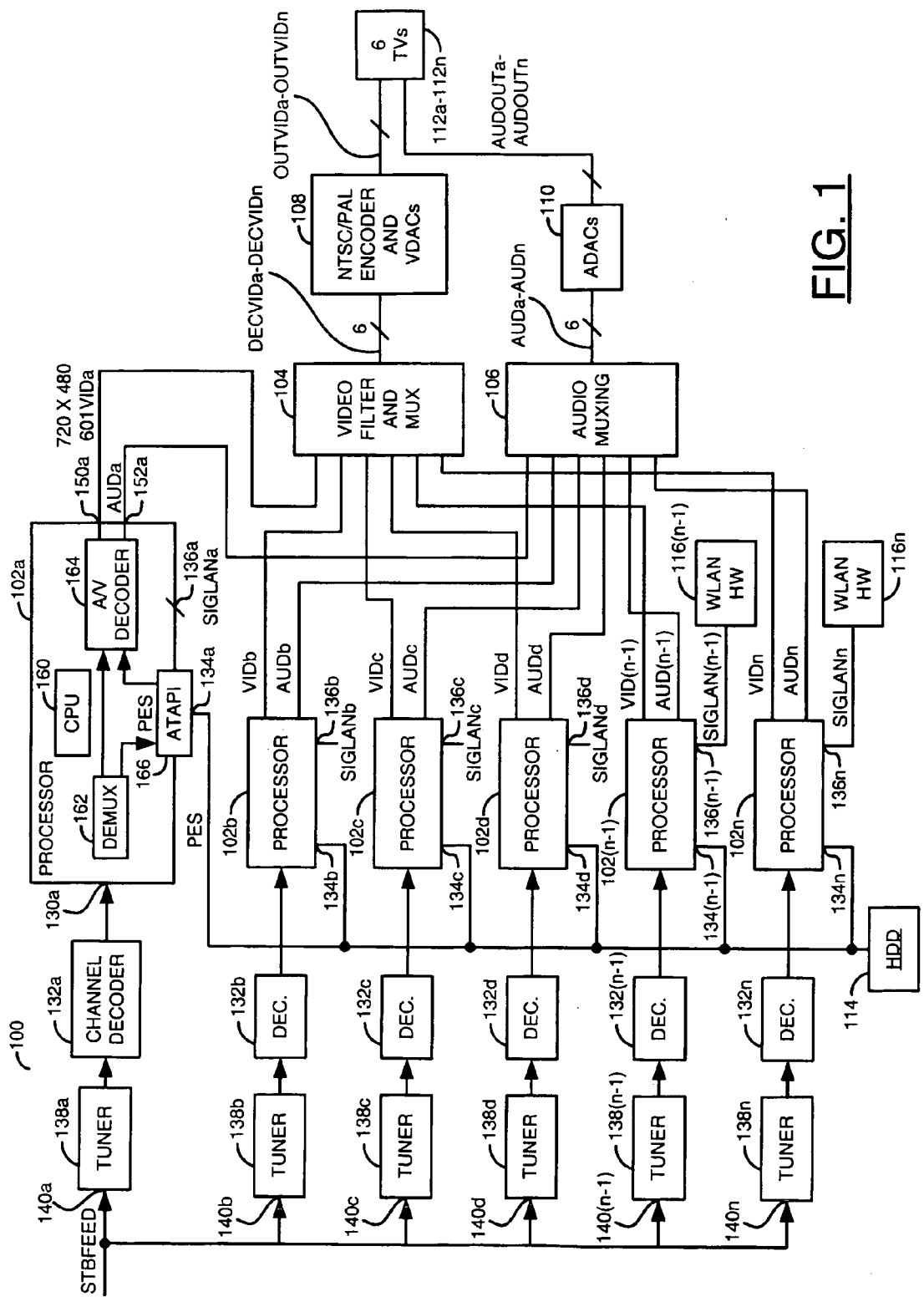
FIG. 1 is a block diagram of a preferred embodiment of the present invention.

Referring to FIG. 1, a block diagram of a system 100 is shown in accordance with a preferred embodiment of the present invention. The system 100 may be implemented as a set top box (STB) access system with integrated home functions such as intercom and doorbell. The system 100 playback may be tagged with user audio or markers from other sources (e.g., keyboard, remote control unit, etc.). The system 100 may stream record and playback with timing relationships between multiple streams for sequencing. The system 100 streams may be searched for keywords at an accelerated rate. When a keyword match occurs, the system 100 may enable a number of functions (e.g., recording, sequencing, video display options, etc.). The system 100 stream content may be used to conduct a search on the Internet (e.g., web). A system 100 remote control unit (RCU) may enable the system 100 to save a system state for easy resuming of playback.

The system 100 generally comprises a number of processing devices 102a–102n, a multiplexer 104, a multiplexer 106, an encoder 108, a converter 110, one or more output devices 112a–112n, a fixed storage device (e.g., a hard disk drive, HDD) 114, and one or more external LAN sources 116a–116n. Each of the decoding devices 102a–102n may have an input 130 that may receive a signal from a channel decoder 132, an input 134 that may receive one or more signals (e.g., PES) from a fixed storage device 114 and an input 136 that may receive a signal (e.g., SIGLAN) from the external LAN source 116. The decoders 132a–132n may receive a signal from a tuner 138a–138n. The tuners 138a–138n may have an input 140a–140n that may receive one or more signals (e.g., STBFEED). Each of the decoders 102a–102n may have an output 150a–150n and an output 152a–152n. A signal (e.g., VID) presented by the output 150 may be presented to the multiplexer 104, while a signal (e.g., AUD) presented by the output 152a–152n may be presented to the multiplexer 106. The multiplexer 104 may have one or more outputs that may present one or more signals (e.g., DECVIDa–DECVIDn) to the encoder 108. The encoder 108 may present one or more signals (e.g., OUT-VIDa–OUTVIDn) to the device 112. The multiplexer 106 may present the signal AUD to the converter 110. The converter 110 may present one or more signals (e.g., AUD-OUTa–AUDOUTn) to the device 112. In one example, the HDD 114 may be implemented internal to the system 100. In another example, the HDD 114 may be implemented external to the system 100 (e.g., in a PC).

The signal STBFEED may be any appropriate uncompressed audio/video signal (e.g., an over the air television broadcast, web broadcast, satellite feed signal, modem signal (e.g. 56 kbps or higher), or WLAN signal (e.g., IEEE 802.11, 11 Mbps), etc.). The signal PES may be a program elementary stream representation of the signal STBFEED and/or other live or recorded signals. In one example, the signal PES may be an MPEG2 encoded signal. The signal SIGLAN may be implemented similarly to the signal PES. The signal VID may be a 601V (e.g., decoded and/or uncompressed video) feed. The signal VID may be, in one example, a 720×480 video portion of the signal STBFEED. However, any appropriate video display resolution may be implemented accordingly to meet the design criteria of a particular application. The signal AUD may be a decoded and/or uncompressed audio portion of the signal STBFEED. The signal DECVID may be a decimated and sized representation of the signal VID. The signal OUTVID may be an encoded version of the signal DECVID. The signal OUT-VID may be encoded to an appropriate standard (e.g., NTSC, PAL, etc.) accordingly to meet the design criteria of a particular application. The signal AUDOUT may be a converted (e.g., digital to analog converted) representation of the signal AUD.

In one example, the system 100 may be implemented using six of the devices 102, 112, 132, and 138. However, any number of the devices 102, 112, 132, and 138 may be implemented accordingly to meet the design criteria of a particular application. For example, the system 100 may be configured to present twelve audio/video streams VID and/or the signal AUD to a single output device 112.

The multiplexer 104 may be implemented as a video filter and multiplexer device. The multiplexer 106 may be implemented as an audio multiplexer. In one example, the encoder 108 may be implemented as one or more NTSC/PAL encoder and video digital to analog converters. However, any appropriate encoder and/or display conversion and interface circuitry may be implemented accordingly to meet the design criteria of a particular application. The converter 110 may be implemented as one or more audio digital to analog converters. The devices 112a–112n may be implemented as conventional television (TV) sets. However, any appropriate output monitoring and/or listening device and/or devices may be implemented to meet the design criteria of a particular application. In another example, the device 112a–112n may comprise one or more conventional TVs for audio/video viewing and listening and/or one or more external speakers for listening. In another example, the devices 112a–112n may comprise (i) one or more video displays such as video monitors and/or (ii) speakers and/or headphones for listening.

In one example, the processors 102a–102n may be implemented as LSI Logic SC2005 processors. However, any appropriate audio/video processor may be implemented accordingly to meet the design criteria of a particular application. The processors 102a–102n may be configured to (i) receive STB streams (e.g., the channel decoded output signal representation of the signal STBFEED from the decoders 132a–132n), (ii) access the HDD 114, (iii) provide A/V decoding of data streams, (iv) provide WLAN (wireless LAN, such as IEEE 802.11, 11 Mbps) functions, and/or (v) provide multiple stream decode displays simultaneously. Any of the processors 102a–102n may be configured to perform web browsing and/or modem access that may be multiplexed to the A/V uncompressed output (e.g., to the encoder 108 and/or the converter 110).

The device 102 generally comprises a central processing unit (CPU) 160, a demultiplexer 162, an audio/video decoder 164 and a device 166. The CPU 160 is generally configured to control the operation of the device 102. The CPU 160 may be configured to control the device 102 in response to a number of predefined and/or user defined programs. The demultiplexer 162 may have an input that may receive a channel decoded representation of the signal STBFEED, an output that may present a demultiplexed representation of the signal STBFEED to the decoder 164, and an output that may present the signal PES. The decoder 164 may have an input/output that may receive/present the signal PES from the HDD 114 via the device 166. The decoder 164 may have an output that may present the signal VID and an output that may present the signal AUD. The device 166 may be implemented as an AT attachment parallel interface (ATAPI). However, any appropriate interface may be implemented accordingly to meet the design criteria of a particular application.

Figure 2A:
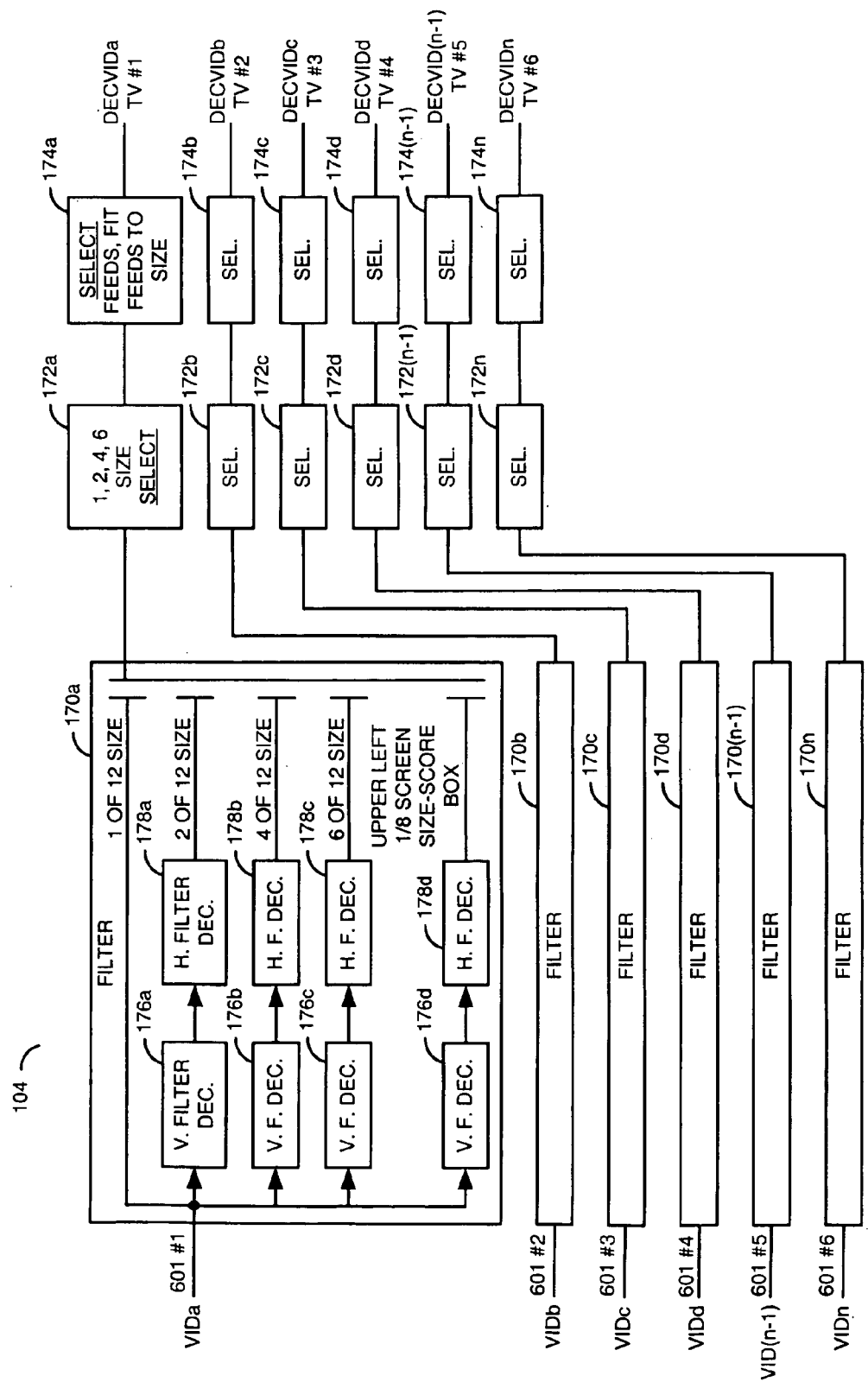
FIGS. 2(a–c) are block diagrams of a filtering and multiplexer circuit and display of FIG. 1.

Referring to FIG. 2a, a more detailed block diagram of the video filtering and multiplexer circuit 104 is shown. The circuit 104 may be an external design (e.g., field programmable gate array (FPGA), application specific integrated circuit (ASIC), etc.) that may be configured to filter display options of each signal VIDa–VIDn. The circuit 104 may be configured to implement a decimated method that responds to user requested display filtering and sizing.

The multiplexer 104 generally comprises one or more circuits 170a–170n, one or more selector circuits 172a–172n, and one or more selector circuits 174a–174n. The circuit 170 may have an input that may receive the signal VID and an output that may be connected to an input of the selector 172. The selector 172 may have an output that may be connected to an input of the selector 174. The selector 174 may have an output that may present the signal DECVID.

The circuit 170 may be implemented as a vertical and horizontal decimation filter. The filter 170 generally comprises one or more vertical decimation filters 176a–176d serially connected to one or more horizontal decimation filters 178a–178d, respectively. The circuit 170 may be configured to provide a number of user selectable video display options. In one example, the display options (described below in connection with FIG. 2c) may be the signal VID filtered and/or sized as (i) any one of twelve, (ii) any two of twelve, (iii) any four of twelve, or (vi) any six of twelve of the signals VIDa–VIDn, and/or a score box size (e.g., typically ⅛ screen size, in the upper left of the screen where a televised game score is displayed).

Figure 2B:
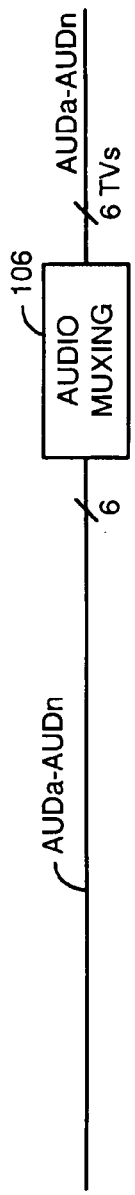

Referring to FIG. 2b, a block diagram of the multiplexer 106 is shown. The multiplexer 106 may be configured to receive the signals AUDa–AUDn and to multiplex the signals AUDa–AUDn as determined by the configuration of the circuit 100 (e.g., the user may select one or more of the signals AUDa–AUDn to be presented to one or more of the output devices 112a–112n).

Figure 2C:
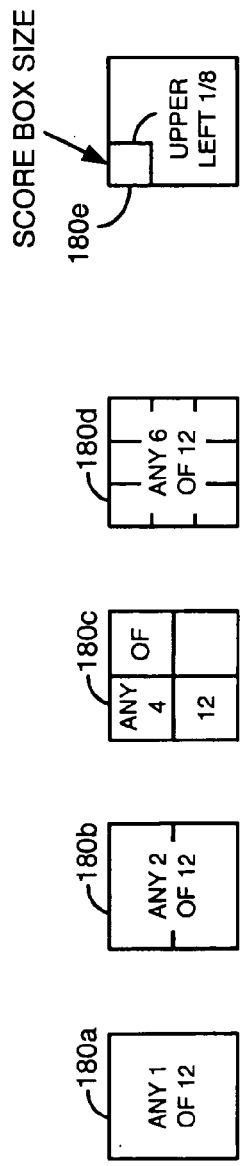

Referring to FIG. 2c, a block diagram illustrating display options 180a–180e is shown. In one example, the user may elect to display on the device 112 any one or more of six of the channel decoded signals STBFEED and/or any six of the signals PES presented by the HDD 114. The display options 180a–180e may be implemented as (i) any one of twelve, (ii) any two of twelve, (iii) any four of twelve, or (vi) any six of twelve of the signals VIDa–VIDn, and/or a score box (typically sized as one-eighth of the display area and projected in the upper left section of the display screen) of the score of one or more games being viewed and/or monitored, respectively.

Figure 3A:
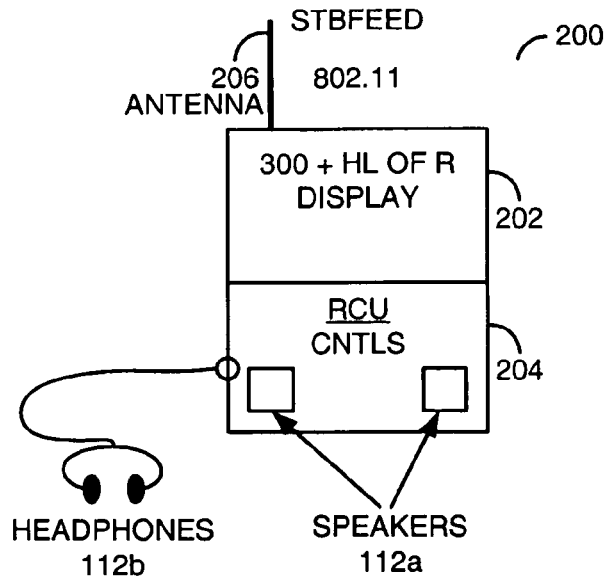
FIGS. 3(a–b) are block diagrams of an in-home remote STB implemented in connection with the present invention.

Referring to FIG. 3a, an in-home remote STB use circuit 200 is shown. The circuit 200 may be implemented similarly to the system 100. The circuit 200 may be configured as a mobile device with a high resolution display (e.g., 300+ lines of horizontal resolution) 202, remote control unit (RCU) controls 204, the one or more speakers 112a, and/or a headphone output configured to interface to headphones 112b. The RCU 204 may be configured to present one or more control signals (e.g., CNTLS). In one example, the RCU 204 may be implemented similarly to a conventional television/VCR/DVD type remote control unit. In another example, the RCU 204 may be implemented as a keyboard or keypad. However, the RCU 204 may be implemented as any appropriate device to meet the design criteria of a particular application. The system 200 may perform conventional functions (e.g., stop, pause, record, etc.) as well as specialized functions (e.g., display of multiple signal feeds STBFEED and/or PES, etc.) in response to the signal CNTLS. The signal STBFEED may be presented to the circuit 200 via an antenna 206.

Figure 3B:
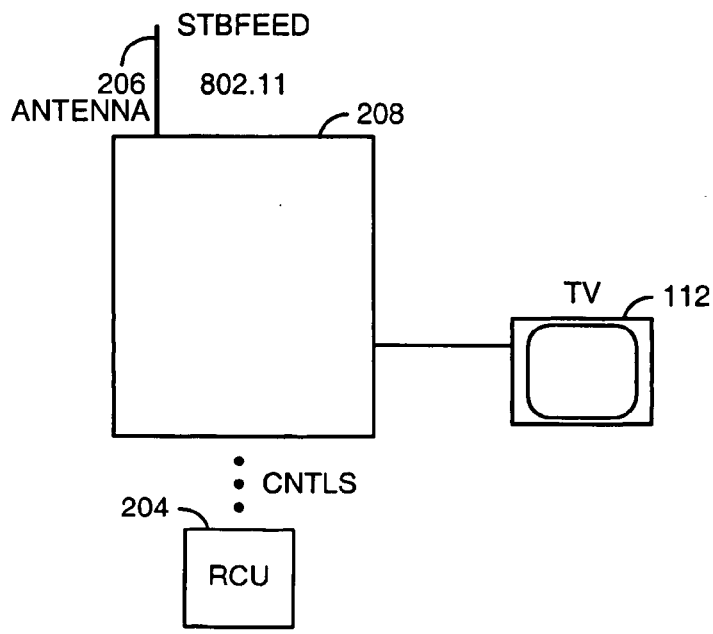

Referring to FIG. 3b, a block diagram of a circuit (or system) 208 illustrating another in-house remote STB player is shown. The circuit 208 may be implemented similarly to the system 100. The circuit 208 may be configured to connect to a conventional TV (e.g., the device 112). Generally, the STB access hub system 208 is connected to a primary viewing TV. However the system 208 may be configured to connect to a number of additional TVs in a typical home and/or commercial installation, similarly to the system 100. The RCU 204 may present the signal CNTLS to the device 208 via a wireless medium (e.g., IR, etc.).

Figure 4:
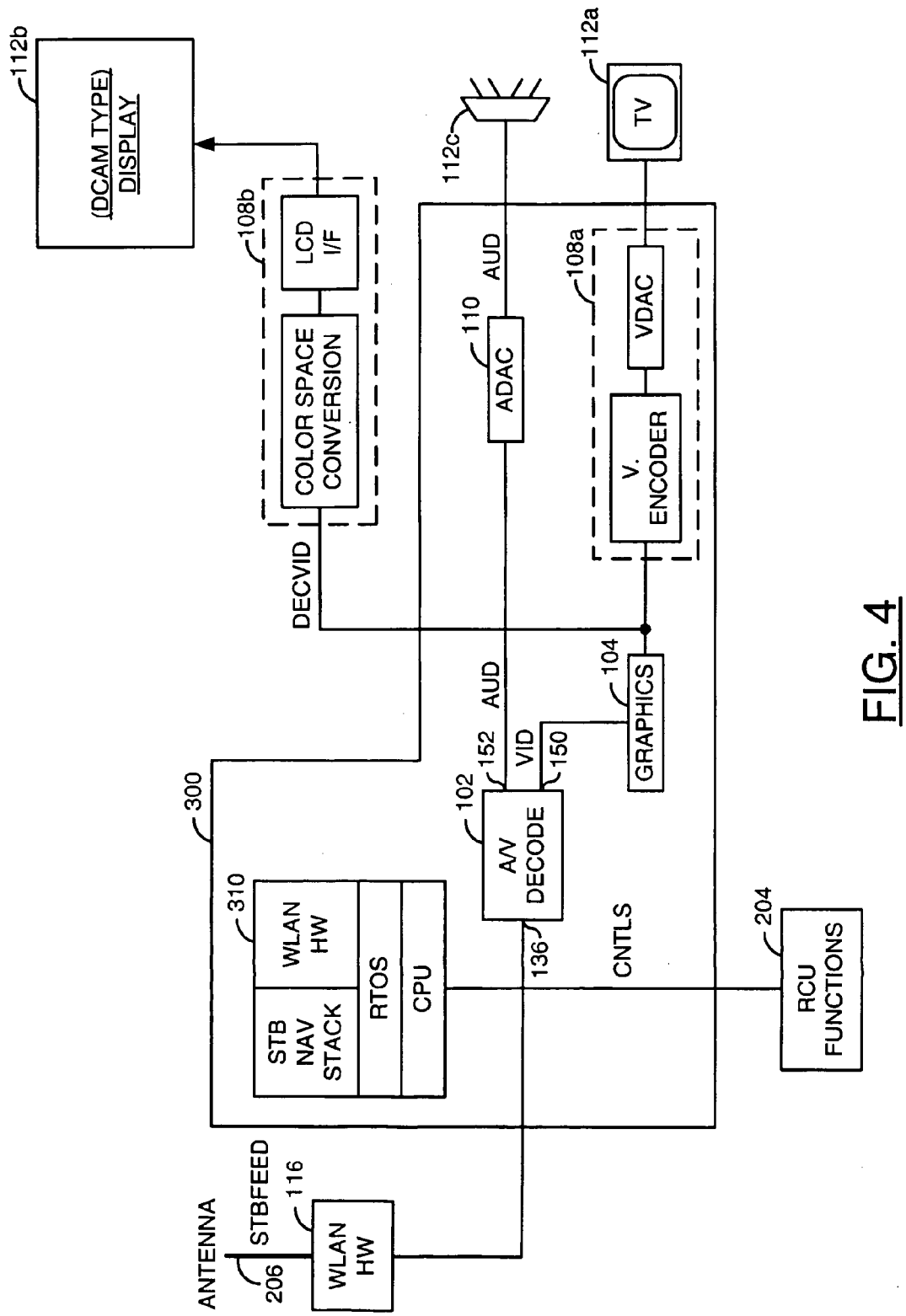
FIG. 4 is a block diagram of a wireless STB player implemented in connection with the present invention.

Referring to FIG. 4, block diagram 300 illustrating a wireless STB circuit (or system) is shown. The circuit 300 may be implemented similarly to the system 100. The circuit 300 may be implemented as a mobile STB device that may be configured to connect to (i) a conventional TV (e.g., device 112a), (ii) an alternative display (e.g., a DCAM type display 112b), and/or (iii) the speakers 112c. The encoder 108b may comprise a color space conversion circuit serially connected to an LCD interface circuit.

The circuit (or system) 300 generally comprises a circuit 310. The circuit 310 may be a control circuit. The circuit 310 may comprise an STB navigation stack that may be configured to enumerate the operations of the circuit 300, a wireless LAN (WLAN) control stack that may be configured to control the operation of the WLAN source 116, a real time operating system (RTOS), and a CPU. The RTOS and/or CPU may be configured to control the system 300 in response to a number of predefined and/or user defined programs. The circuit 310 may be configured to control the operation of the circuit 300 in response to the signals STBFEED, PES and CNTLS.

Figure 5A:
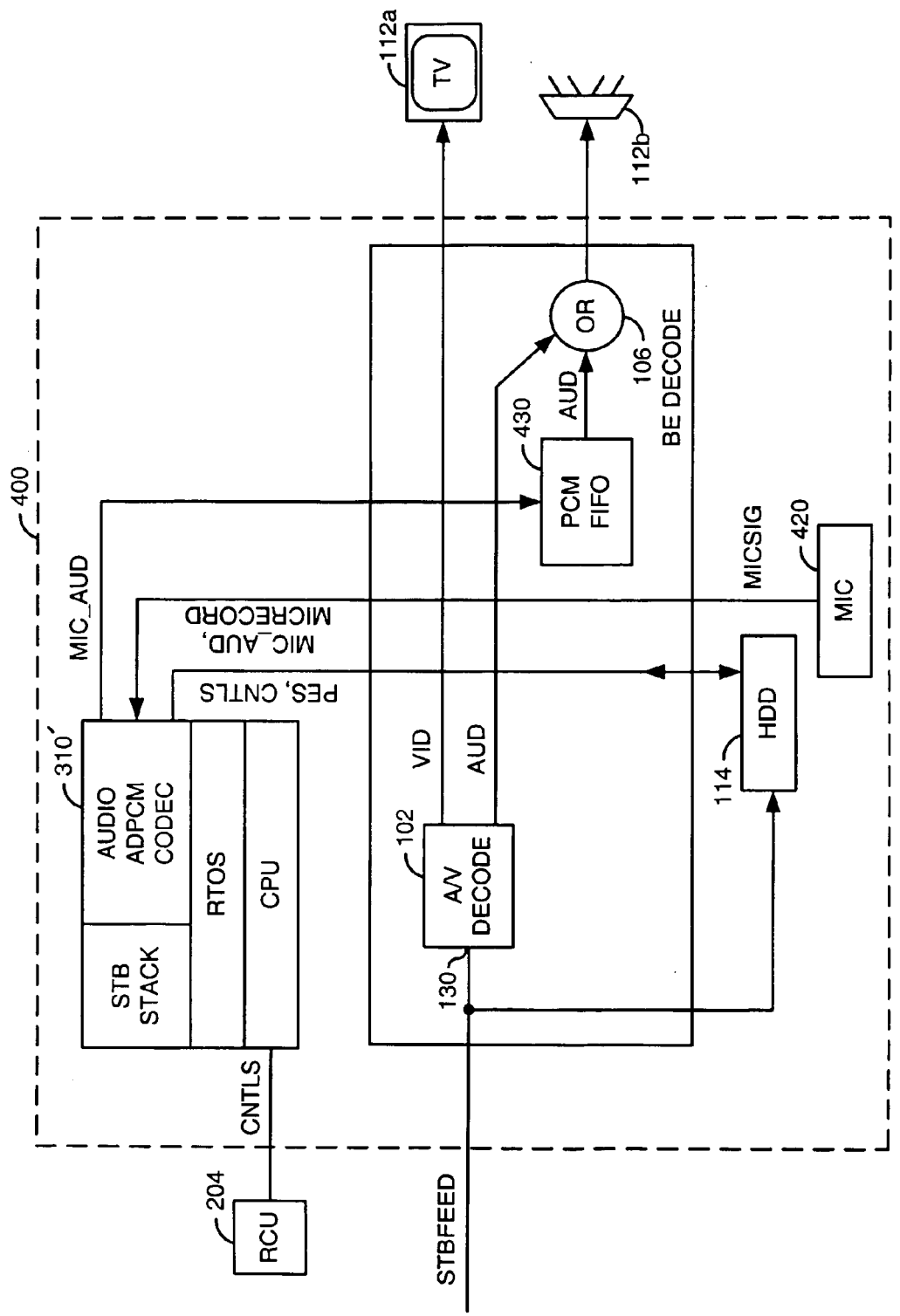
FIGS. 5(a–b) are block diagrams of a capture audio circuit and operation implemented in connection with the present invention.

Referring to FIG. 5a, a block diagram of a circuit 400 illustrating a STB circuit (or system) is shown. The circuit 400 may be implemented similarly to the circuit (or system) 100. The circuit 400 generally comprises a control circuit 310', a device 420, and a circuit 430. The HDD 114 may have an input that may receive the signal STBFEED. The circuit 310' may be implemented similarly to the circuit 310. The circuit 310' may comprise an audio adaptive differential pulse code modulation (ADPCM) codec circuit. The circuit 310' may have an input that may receive a signal (e.g., MICSIG), an input that may receive the signal CNTLS, an input/output that may receive/present the signal PES, and an output that may present a signal (e.g., MIC_AUD). The signal MICSIG may be implemented as an uncompressed audio signal. The signal MICSIG may be encoded as an ADPCM audio signal (e.g., the signal MIC_AUD). The signal MICSIG may be a voice activation signal that may control a number of functions of the system 400 (e.g., record, playback, start, stop, fast forward, fast reverse, pause, resume, etc.). The signals STBFEED, CNTLS and MIC_AUD may be stored on and/or retrieved from the HDD 114 for playback on the device 112 similarly to the signal PES.

The device 420 may be implemented as a home appliance. In one example, the device 420 may be an audio to electrical signal transducer (e.g., microphone, speaker, intercom transducer, etc.). In another example, the device 420 may be an annunciator configured to present an audio and/or electrical signal (e.g., door bell, etc.). The device 420 may be configured to present the signal MICSIG in response to a user voice and/or other user input (e.g., door bell activation). The circuit 430 may have an input that may receive the signal MIC_AUD and an output that may present the signal AUD to the circuit 106. The circuit 430 may be implemented as a PCM FIFO, encoded bitstream decoder. The circuit 430 may be configured to present the signal AUD in response to the signal MIC_AUD.

The system 400 may be configured to capture (store) the ADPCM audio signal MIC_AUD while watching the device 112 and/or recording (storing) one or more other audio/video signals (e.g., STBFEED, SIGLAN, PES, etc.). For example, the user may record audio input (e.g., commentary, audio notes, tag areas for indexing during replay, etc.). In one example, the signals MICSIG or MIC_AUD may be listened to instead of the normal audio feed (e.g., the signal AUDOUT). In another example, the signals MICSIG and/or MIC_AUD may be listened to on one channel (e.g., left or right) of a typical two-channel audio system and the alternate channel may be the normal audio feed (e.g., the signal AUDOUT). In any example, the system 400 may mute the signal AUDOUT and present the signals MICSIG or MIC_AUD. The system 400 may be configured to pause audio and/or video recording to the HDD 114. The signal MIC_AUD may be played back at a later time (e.g., during a commercial, etc.). The system 400 may be configured to implement any of the viewing options 180 of FIG. 2c. The system 400 may be configured to provide normal viewing (e.g., the signal AUDOUT is not muted) when some of the viewing options 180 are enabled while muting the signal AUDOUT when alternate viewing options 180 are enabled.

Figure 5B:
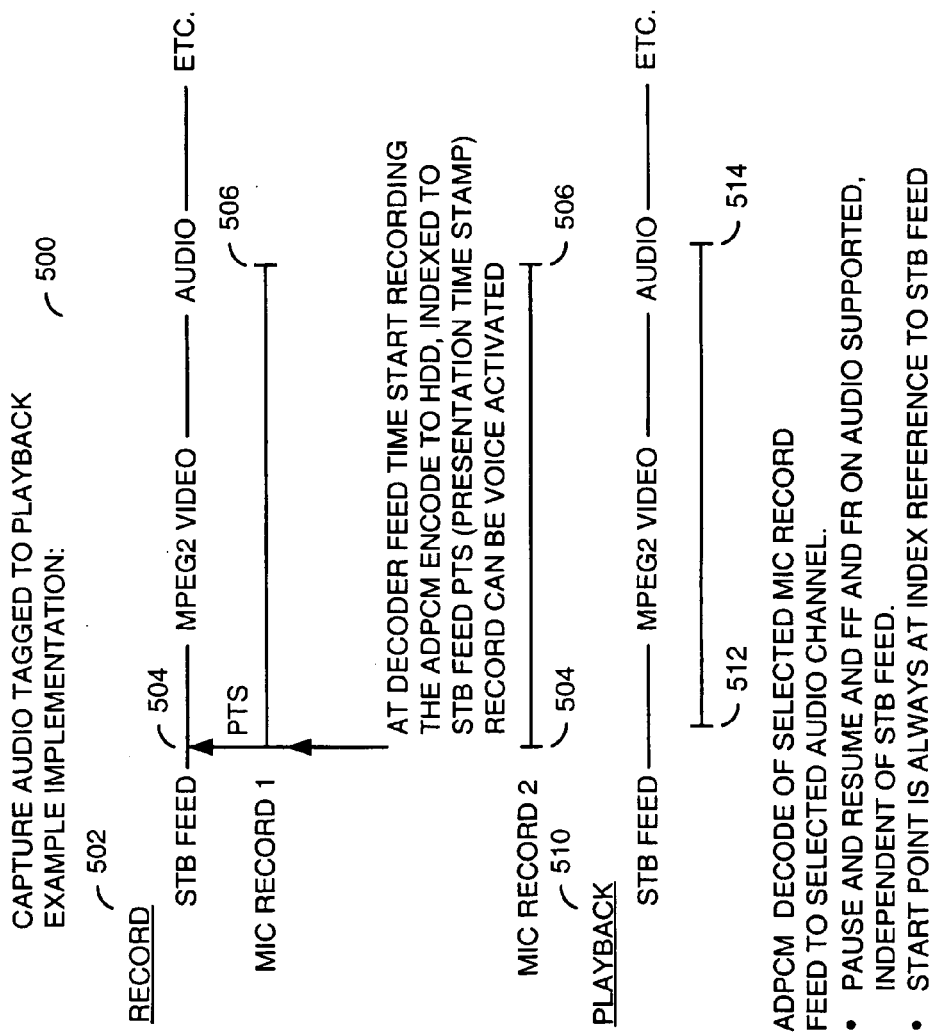

Referring to FIG. 5b, a timing diagram 500 illustrating an operation of the circuit 400 is shown. The system 400 may be configured to apply one or more time presentation stamp tag signals (e.g., PTSa–PTSn) to one or more signals stored on the HDD 114 (e.g., MICRECORDa–MICRECORDn) in response to the signals MIC_AUD and/or CNTLS. The signals MICRECORD may be implemented similarly to the signals PES. In one example, there may be two recorded signals (e.g., MICRECORD1 and MICRECORD2). During a record operation 502, the system 400 may apply the signal PTS at a time 504. The record operation 502 may be complete at a time 506. The signal PTS may index the signals MICRECORD1 and MICRECORD2. The system 400 may be configured to enable functions (e.g., pause, resume, fast forward, fast reverse, etc.) in response to the signals MICRECORD1 and MICRECORD2 independent of the signal STBFEED. The signals PTS may control a number of functions (e.g., indexing, deleting, storing, blending, referencing, etc.).

During a playback operation 510, in one example, the system 400 may play the signal STBFEED and play back the signals MICRECORD1 and MICRECORD2 independent of the signal PTS. In another example, the system 400 may play back the signals MICRECORD1 and MICRECORD2 relative to the signal PTS. A start point time 512 of the playback 510 of the signals MICRECORD1 and MICRECORD2 may be indexed to the signal PTS. The playback 510 of the signals MICRECORD1 and MICRECORD2 may be complete at a time 514. The time interval 512 to 514 may be equal to the time interval 504 to 506.

Figure 6:
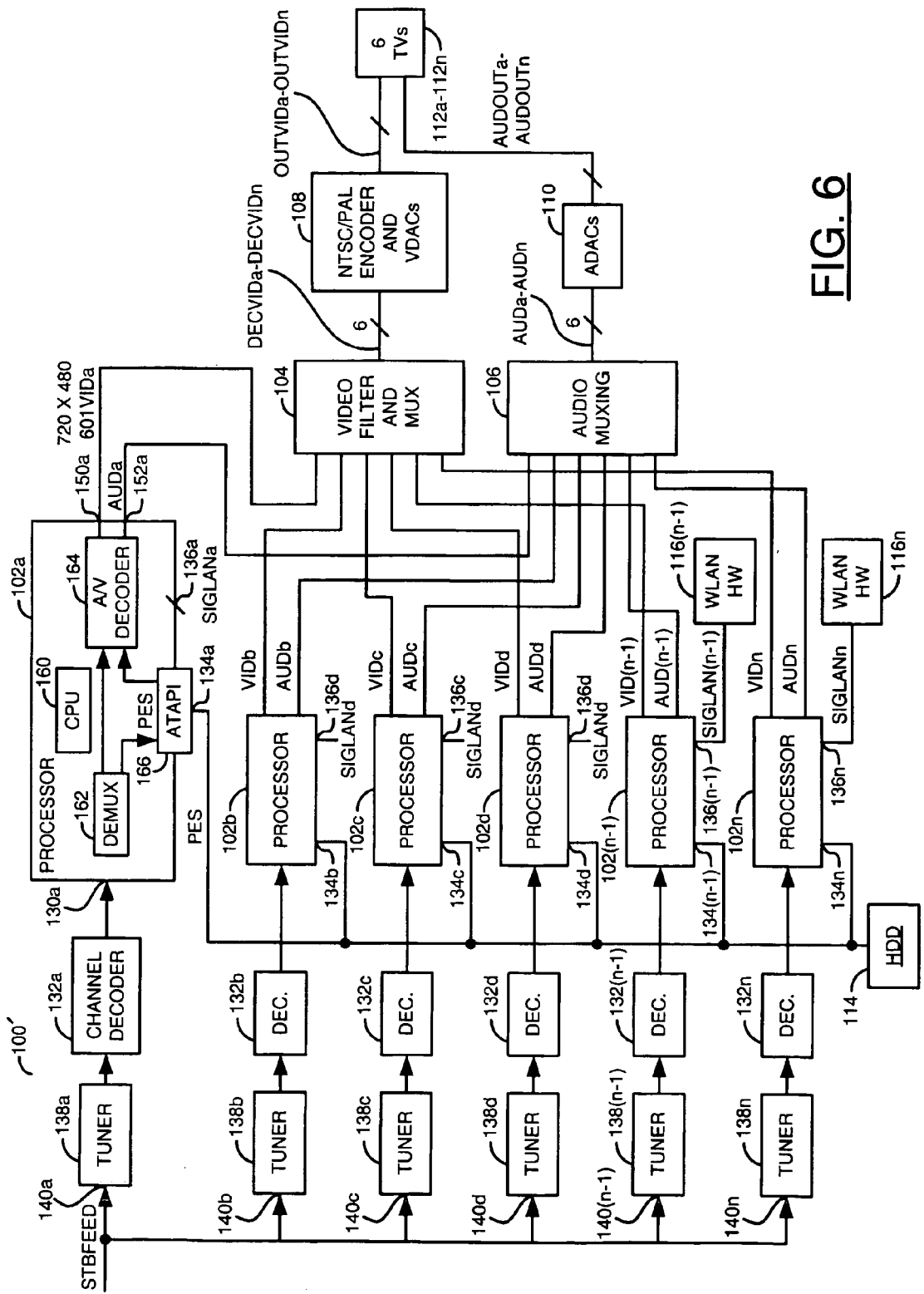
FIG. 6 is a block diagram of an alternate embodiment of the present invention.

Referring to FIG. 6, a system 100' illustrating an alternative embodiment of the STB system of the system 100 is shown. The system 100' may be implemented similarly to the systems 100 and 400.

The system 100' may be configured to enable independent web access by one or more individual users of the devices 112a–112n. The system 100' may be configured to cache the last 'n' pages of the signal STBFEED in the HDD 114. The system 100' may be configured to perform anticipatory caching of other pages downlevel from the page of the signal STBFEED active in the system 100'. The anticipatory caching operation may be nonintrusive on the currently active performance of the system 100'. The system 100' may be configured to enable the user to mark particular pages of the signal STBFEED to be cached. In one example, when previously cached web pages are stored on the HDD 114, the system 100' may not access the web via a modem. The system 100' may be configured (e.g., programmable by the user) to turn off the web access when there has been no web access related activity for 'x' minutes.

Conventional video processing technologies (e.g., National Semiconductor Internet Appliance products, etc.) support 800×600 display resolution. The system 100' is generally configured to provide a 720×480 display resolution that may be consistent with the conventional display resolution technology. However, any appropriate video display resolution may be implemented accordingly to meet the design criteria of a particular application.

The signal SIGLAN may comprise a program elementary stream similar to the signal PES. When the system 100' receives the signal SIGLAN, the signal OUTVID may be implemented similarly to the signal OUTVID implemented when the signal STBFEED and/or the signal PES are presented to the device 102. The system 100' user may experience equivalent display and/or listening parameters regardless of the source of the audio/video signal (e.g., STBFEED, SIGLAN, PES, MICRECORD, MICSIG, etc.).

When the system 100' is implemented as a six channel STB configuration, a number of broadcasts (e.g., all Sunday U.S. NFL football games) that are broadcast simultaneously may be viewed on any combination of up to six individual TVs 112a–112f. Alternatively, all six of the football games may displayed simultaneously on a single TV 112.

The system 100' may be configured to view, record, pause, then view up to six of the signals recorded on the HDD 114 (e.g., PES, STBFEED, MIC_AUD, SIGLAN, etc.) simultaneously. The system 100' may be configured to receive n of the signals STBFEED and n of the signals SIGLAN. In one example, the system 100' may display any combination of any six live or six recorded signals. The system 100' may be configured to record signals (e.g., STBFEED, SIGLAN, CNTLS, MICSIG, PTS, etc.) directly to the HDD 114.

The system 100' may be configured to store signals (e.g., STBFEED, SIGLAN, CNTLS, MICSIG, PTS, etc.) to the HDD 114 with a timing relationship between the signals based on relative and/or wall clock time. Storing with a timing relationship between the signals may enable the system 100' to playback with the same signal sequence prior to when the system 100' was paused.

Figure 7:
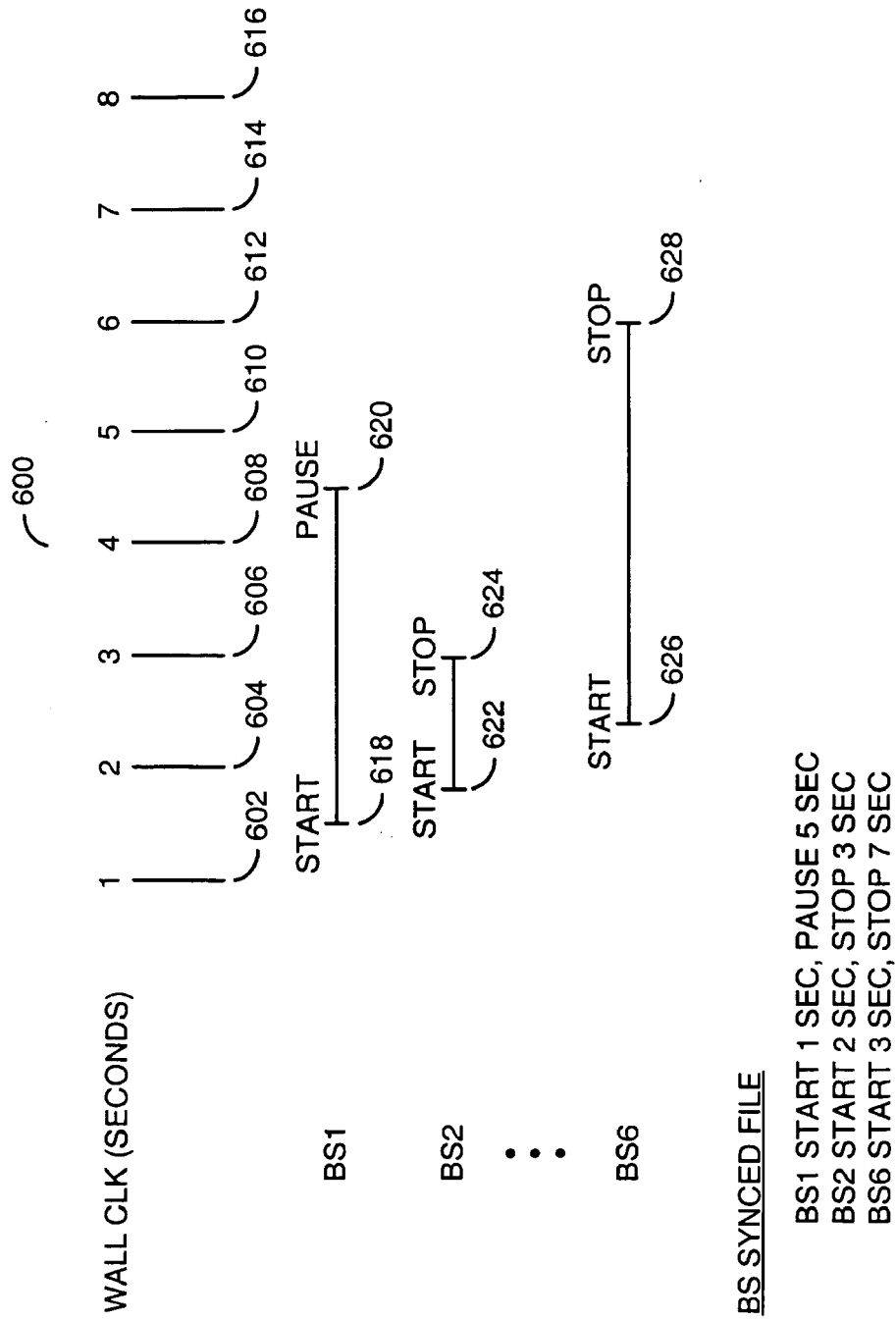
FIG. 7 is a timing diagram of a bitstream synchronized file.

Referring to FIG. 7, a timing diagram 600 illustrating a timing relationship between signals for a store (record) operation of the system 100' is shown. In one example, the system 100' may be configured to perform a number of functions (e.g., pause, view, mute, intercom (present to the user via a listening device 112), tag, etc.) on any combination of the source signals (e.g., STBFEED, SIGLAN, MICSIG, CNTLS, PTS, PES, etc.). The system 100' may be configured to store the source signals as one or more bitstream synchronized signals (e.g., BSa–BSn) in the HDD 114. In one example, there may be six bitstream synchronized signals (e.g., BS1–BS6).

The system 100' may be configured having a series of wall clock time one-second time intervals 602, 604, . . . 616. However, any appropriate time interval may be implemented accordingly to meet the design criteria of a particular application. The system 100' may record the respective wall clock time as well as the source signal in the signals BS1–BS6. The system 100' may be configured to trigger the HDD 114 to start recording the signal BS1 at a time 618. The time 618 may occur during the wall clock time interval 602–604. The system 100' may be configured to pause the signal BS1 at a time 620. The time 620 may occur during the wall clock time interval 608–610.

The system 100' may be configured to trigger the HDD 114 to start recording the signal BS2 at a time 622. The time 618 may occur during the wall clock time interval 602–604. The system 100' may be configured to stop recording the signal BS2 at a time 624. The time 624 may occur at the wall clock time interval 606.

The system 100' may be configured to trigger the HDD 114 to start recording the signal BS6 at a time 626. The time 626 may occur during the wall clock time interval 604–606. The system 100' may be configured to stop recording the signal BS6 at a time 628. The time 628 may occur at the wall clock time interval 612. Other bitstream synchronized signals (e.g., BS3–BS5) may be recorded similarly.

The HDD 114 may be configured to generate a file (e.g., BS_SYNCED_FILE) of the bitstream synchronized signals BS1–BS6 where (i) the signal BS1 starts at a time relative to the first one-second interval (602) and pauses at a time relative to the fifth one-second interval (610) of wall clock time, (ii) the signal BS2 starts at a time relative to the second one-second interval (604) and stops at a time relative to the third one-second interval (606) of wall clock time, and (iii) the signal BS6 starts at a time relative to the third one-second interval (606) and stops at a time relative to the seventh one-second interval (614) of wall clock time.

Figure 8:
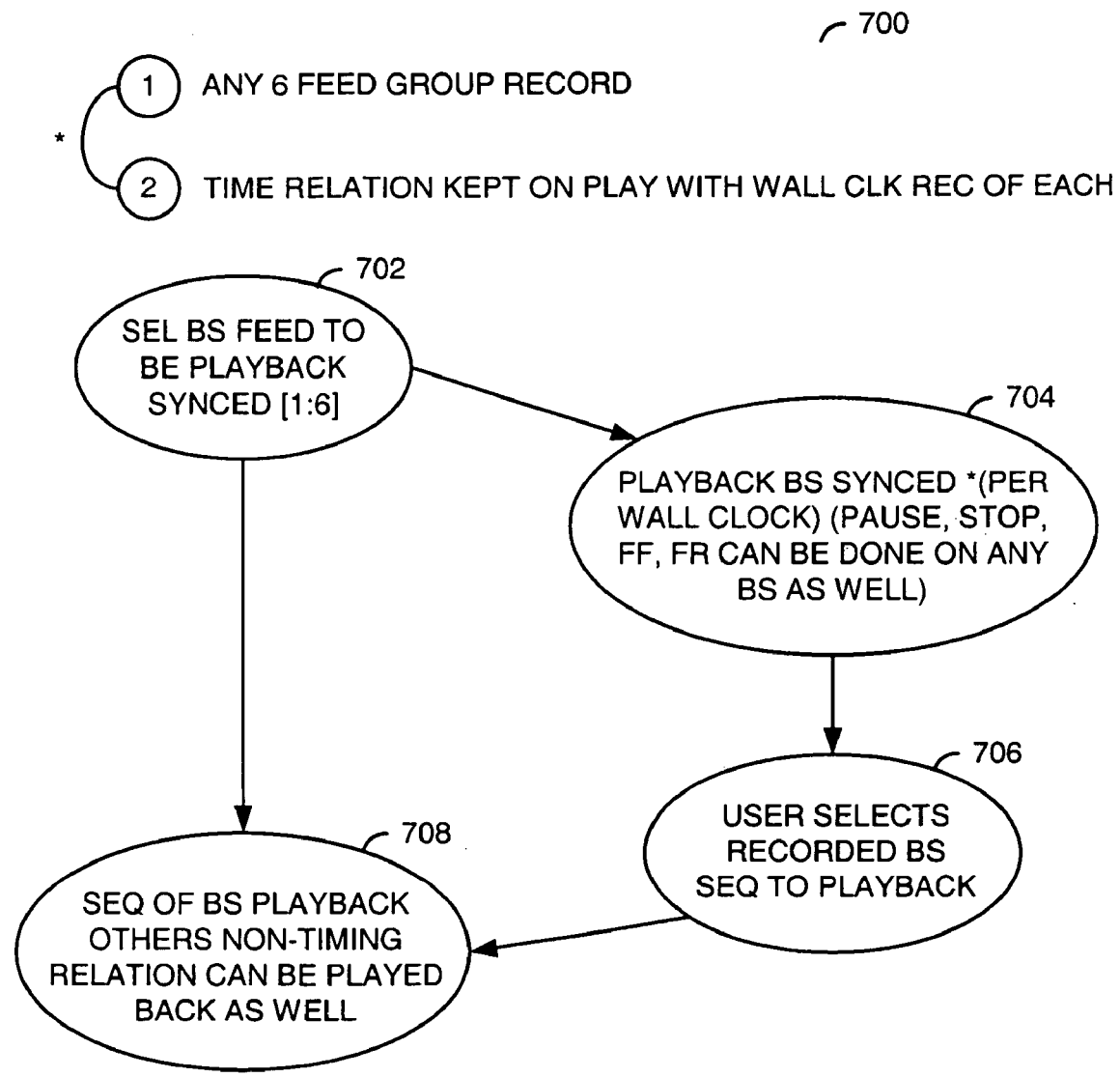
FIG. 8 is a block diagram of an operation of the present invention.

Referring to FIG. 8, a timing diagram 700 illustrating a playback operation of the system 100' is shown. The system 100' may be configured such that during the playback 700 (i) any combination of one or more of the signals comprising the file BS_SYNCED_FILE (e.g., the signals BS1–BS6) may be played back simultaneously and (ii) the timing relationship between the signals BS1–BS6 may be maintained with the recorded wall clock timing and/or the relative timing between the signals BSa–BSn.

The system 100' may be configured such that the user may select any combination of one or more of the source signals (e.g., STBFEED, SIGLAN, MICSIG, CNTLS, PTS, PES, etc.) to be synchronized to the playback 700 (e.g., block 702). Since the signals BS1–BS6 generally include a record of the wall clock time when recorded, the user may configure the system 100' to perform any combination of a number of functions (e.g., pause, view, mute, intercom, etc.) on any combination of the signals BS1–BS6 during the playback 700 (e.g., block 704). The system 100' may be configured such that the user may select any combination of one or more of the signals comprising the file BS_SYNCED_FILE (e.g., the signals BS1–BS6) to be played back (e.g., block 706). The system 100' may be configured such that the user may alter the timing relationship of the signals BS during the playback 700 (e.g., block 708). The system 100' may be configured to repeat the playback operation 700.

The system 100' may be configured such that, in one example, any combination of one or more of the source signals (e.g., STBFEED, SIGLAN, MICSIG, CNTLS, PTS, PES, etc.) may be keyword searched. Generally the keyword search comprises a line 21 (e.g., closed captioning signal) text analysis for keyword matches. However, any appropriate search technology may be implemented to meet the design criteria of a particular application.

In another example, the system 100' may be configured to automatically search through all active signals in an average divided way for keyword matches. The average divided search may be an accelerated search that may enable the system 100' to implement the fastest search time. The average divided search may comprise a routine to divide up the search based on the available channels across the enabled devices 102a–102n in the system 100'.

The line 21 search keyword search options may include currently viewed channels, average channels available to be equally distributed for search on viewed channel, and/or background (non-viewed) channel search using available channel bandwidth and switch capability. The system 100' may be configured such that the keyword source may include (i) highlighted text of stored or real-time line 21 keywords, (ii) and keyboard/keypad entry of the keyword, and/or (iii) entry of the keyword via the RCU 204.

When the system 100' successfully finds keywords (e.g., matches the keywords), a number of functions may be enabled (e.g., record, display over an existing display 112, prompt the user that requested the search (e.g., present a beep via the speaker 112, a message on a screen of the display 112, etc.), index/tag (e.g., apply the tag signal PTS) the point in the data stream (e.g., the signals STBFEED, PES, etc.) where the match occurred, etc.).

The system 100' may be configured to enable web access of alternate source signals based on a keyword search of a first source signal. For example, a news headline text item from a first source signal (e.g., STBFEED, SIGLAN, etc.) on the web may be used to do a real-time line 21 text search for related stories on one or more other source signals. When a match occurs, the system 100' may mark (tag) and store, and/or display the one or more signals (STBFEED, SIGLAN, etc.) having the match.

The system 100' may be configured such that the signal MICSIG, the ADPCM signal MIC_AUD, and/or the signal CNTLS may perform audio capture (e.g., record the signals BSa–BSn) and set markers (e.g., apply the tag signals PTSa–PTSn). In one example, the signal MICSIG may apply a start tag and a stop tag (e.g., a first and a second tag signal PTS) to one or more of the signals BSa–BSn. The user may elect to view only the portion of the signal BS between the first and second tag signals PTS. In another example, the user may use the RCU 204 to present the appropriate signal CNTLS to apply the signals PTS to another one or more of the signals BSa–BSn at the desired start and stop times. The user may elect to view only the portion of the signal BS between the start and stop tag signals PTS.

The RCU 204 may be configured to mark (e.g., tag using the signal PTS) one or more sections of the signals PES. The signal PES that is marked may be either a live signal (e.g., presented to the HDD 114) or a recorded signal (e.g., presented by the HDD 114). One or more of the signals PES may be marked (tagged) simultaneously. The signal PES may be tagged to control a number of functions (e.g., indexing, selection for saving or deletion, defining search boundaries, etc.).

The system 100' may be configured for indexing the signals PES to a number of parameters (e.g., sections tagged with the signal MICSIG, sections tagged with the signal CNTLS, keyword search match sections, etc.). The system 100' may be configured to use a selected section of the signal PES to delete or paste to a new edited section area (e.g., a sequence boundary) of the same and/or different signal PES.

The system 100' may be configured to 'clean up' the HDD 114. When the clean up function is implemented, the system 100' may, in one example, review the available storage space in the HDD 114 and/or delete all of the files (e.g., PES, MICRECORD, etc.) stored in the HDD 114 not used in the last x days as record priority is taken. The number x may be selected and/or programmed by the user. The tag signals PTS may be configured to provide constraints for the record priority. The system 100' may be configured to delete all signals stored in the HDD 114 (e.g., PES, MICRECORD, etc.) that do not contain the tag signal PTS during clean up. The system 100' may be configured to perform the clean up until adequate storage space is available in the HDD 114 to perform a currently pending operation.

The system 100' and/or remote STB system (e.g., the systems 200 and/or 208) may comprise one or more flash memories (not shown). The flash memory may be configured to perform a number of storage functions (e.g., saving system setup, program selection, display selection, point in a program where a stop occurred, point of keyword search stop, frequency of keyword search matches, etc.).

The system 100' may be configured to assert a beep (e.g., an audio signal on the speaker 112) when the keyword search has located and recorded matches. For example, the word 'Tornado' may not have a match on live broadcast for 3 days. When the match occurs, the system 100' may begin recording (e.g., storing the signal PES to the HDD 114) at the time of the match. When the word 'Tornado' is repeated, the recording may continue every 'y' minutes after each occurrence.

The system 100' may be configured to store a number of system states (e.g., system playbacks, records, searches, conditional logging during non-use or re-use, etc.). The system 100 may be configured to include constrained web searches based on search results of the source signals (e.g. STBFEED. PES, SIGLAN, etc.).

In a typical example, a game score may be displayed in the upper left section of the on the devices 112 display (e.g., the display option 180e) for all of the signals OUT-VIDa–OUTVIDn. In one example, the system 100' may be configured to enable the user to present the appropriate signal CNTLS such that the game score is the full display on the device 112 (e.g., the display option 180a).

In another example, the system 100' may be configured (armed) to switch display modes 180 when a threshold change (delta) of a game score occurs (e.g., when a football game score changes by six points indicating a touchdown was made). The game score delta may be selected by the user. The game score delta may be a different value for any of the source signals (e.g., a delta may be six points for one game and three points for another game, etc.). The system 100' may be configured to implement a full screen display (e.g., the display option 180a) of the signal OUTVID having the delta of the game score. The system 100' may be configured to mark (tag) and record for playback the last 'n' seconds of the source signal (e.g., STBFEED, PES, SIGLAN, etc.) having the threshold change of the game score. The system 100' may be configured to link for game score change summary display all of the recorded games source signals having the game score deltas above the threshold.

The conventional STB market is migrating to supporting a HDD and eventually, 2 tuners, for receiving two input data streams concurrently. The present invention may provide a full STB hub system for home and/or commercial (e.g., barroom, etc.) applications. The present invention may provide (i) mobile (wireless) STB support (e.g., the system 200), (ii) remote STB support (e.g., the system 208), (iii) numerous simultaneous channels for market driven applications such as fall Sunday NFL football with six games broadcast on satellite simultaneously, (iv) integrated home functions, (v) local or PC hard disc record, (vi) searching and indexing streams based on pre-defined or user defined programs.

Additional alternative embodiments of the present invention may include automatic division of available user selected channels (e.g., the source signals STBFEED, SIGLAN, PES, etc.) to balance searching across the available tuners/demodulators (e.g., the processors 102, the tuners 138, etc.).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   an audio/video decoder configured to receive (i) one or more uncompressed audio signals, (ii) one or more compressed audio/video signals and (iii) one or more remote control signals;
   a storage device, wherein (i) any one of said uncompressed audio signals and said remote control signals are tagged to said compressed audio/video signals to produce one or more tagged compressed audio/video signals and (ii) any of said one or more uncompressed audio signals and said one or more tagged compressed audio/video signals are stored in said storage device and available for a playback relative to said tags; and
   a control circuit having an audio adaptive differential pulse code modulation (ADPCM) codec circuit configured to generate one or more compressed audio signals in response to compressing said one or more uncompressed audio signals prior to storing, wherein said control circuit is configured to present/receive (a) said one or more remote control signals, (b) one or more elementary streams, and (c) one or more compressed audio signals to and from said storage device.

2. The apparatus according to claim 1, wherein said tags are configured to provide indexing, deleting, storing, blending or referencing said one or more tagged compressed audio/video signals.

3. The apparatus according to claim 1, wherein said uncompressed audio signal is a microphone or intercom input providing voice activation to one or more start, stop, fast forward, fast reverse, pause, and/or resume functions of said apparatus.

4. The apparatus according to claim 1, wherein said uncompressed audio signals (i) mutes a normally decoded audio portion of said one or more compressed audio/video signals and (ii) is sent through the system for audio listening.

5. The apparatus according to claim 1, wherein (i) said apparatus comprises a plurality of audio/video decoders and (ii) more than one of said one or more tagged compressed audio/video signals are stored and played back maintaining a relative time relationship in response to said tags.

6. The apparatus according to claim 5, wherein said apparatus is configured to perform one or more functions selected from the group consisting of pause, view, mute, intercom, start, stop, fast forward, fast reverse, and resume of said playback of said one or more tagged compressed audio/video signals.

7. The apparatus according to claim 1, wherein said apparatus is configured to keyword search one or more line 21 or closed caption video lines of said one or more compressed audio/video signals, dividing an available performance of said search in an equal way.

8. The apparatus according to claim 7, wherein when a keyword match occurs during said keyword search said apparatus is configured to perform one or more functions selected from the group consisting of (i) record said one or more compressed audio/video signals, (ii) display on a monitoring device an uncompressed representation of said one or more compressed audio/video signals, (iii) index a point in said one or more compressed audio/video signals where said keyword match occurred, (iii) enable one or more playback, stop, fast forward, fast reverse, pause, and mute functions of said apparatus, (iv) prompt a user of said apparatus of a status of said search, (vi) and enable said apparatus to perform one or more web access functions.

9. The apparatus according to claim 1, wherein said apparatus is configured to perform one or more functions selected from the group consisting of (i) review said storage device for a memory availability based on one or more constraints provided by said tags and (ii) delete said one or more tagged compressed audio/video signals based on a priority program as programmed by a user of said apparatus.

10. The apparatus according to claim 9, wherein said apparatus is configured to perform one or more functions selected from the group consisting of (i) delete said one or more tagged compressed audio/video signals stored in said storage device and not used in 'x' days and (ii) delete said one or more compressed audio/video signals in said storage device until said memory availability is sufficient to do a current operation in response to said priority program.

11. The apparatus according to claim 1, wherein said apparatus comprises a flash memory configured to store one or more program setups selected from the group consisting of a program selection, a display selection, a point in a program where a stop occurred, a point of a keyword search where a stop occurred, and a frequency of matches of said keyword during said keyword search.

12. The apparatus according to claim 1, wherein one or more compressed audio/video signals are live and another one or more compressed audio/video signals are stored.

13. The apparatus according to claim 1, wherein said apparatus comprises a multiplexing circuit configured to present an uncompressed representation of said one or more compressed audio/video signals to one or more monitoring devices.

14. The apparatus according to claim 1, wherein (i) said audio/video decoder system is configured to receive one or more remote control signals and (ii) said one or more remote control signals are configured to tag said compressed audio/video signals.

15. A method for tagging compressed audio/video signals, comprising the steps of:
   (A) receiving one or more of said compressed audio/video signals;
   (B) tagging said one or more compressed audio/video signals in response to any one or more uncompressed audio signals and one or more remote control signals to produce one or more tagged compressed audio/video signals;
   (C) storing said one or more tagged compressed audio/video signals with a storage device and playing back an uncompressed representation of said one or more tagged compressed audio/video signals relative to a timing of said tags;
   (D) generating one or more compressed audio signals in response to compressing said one or more uncompressed audio signals prior to storing with audio adaptive differential pulse code modulation; and
   (E) presenting/receiving (a) said one or more remote control signals, (b) one or more elementary streams, and (c) one or more compressed audio signals to and from said storage device.

16. The apparatus according to claim 1, wherein said one or more elementary streams is (a) a program elementary stream representation of said one or more compressed audio/video signals and (b) an MPEG encoded signal.

17. The apparatus according to claim 16, further comprising:
   a remote control unit configured to (i) generate said remote control signals and (ii) allow a user to tag said one or more elementary streams with said remote control signals; and
   a microphone coupled to said control circuit to further allow a user to tag said one or more elementary streams with said one or more uncompressed audio signals.

18. An apparatus comprising:
   an audio/video decoder configured to receive (i) one or more uncompressed audio signals, (ii) one or more compressed audio/video signals and (iii) one or more remote control signals;
   a storage device, wherein (i) any one of said uncompressed audio signals and said remote control signals are tagged to said compressed audio/video signals to produce one or more tagged compressed audio/video signals and (ii) any of said one or more uncompressed audio signals and said one or more tagged compressed audio/video signals are stored in said storage device and available for a playback relative to said tags; and
   a control circuit having an audio adaptive differential pulse code modulation (ADPCM) codec circuit configured to generate one or more compressed audio signals in response to compressing said one or more uncompressed audio signals prior to storing, wherein said control circuit is configured to present any one of said compressed audio signals and said uncompressed audio signals to a user via a pulse code modulation FIFO circuit.

* * * * *